(12) United States Patent
Fujimoto et al.

(10) Patent No.: US 11,834,063 B2
(45) Date of Patent: Dec. 5, 2023

(54) VEHICLE CONTROL DEVICE AND VEHICLE CONTROL METHOD

(71) Applicant: HONDA MOTOR CO., LTD., Tokyo (JP)

(72) Inventors: Naotoshi Fujimoto, Wako (JP); Yuji Tsuchiya, Wako (JP); Takashi Oshima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 78 days.

(21) Appl. No.: 17/581,336

(22) Filed: Jan. 21, 2022

(65) Prior Publication Data

US 2022/0258758 A1  Aug. 18, 2022

(30) Foreign Application Priority Data

Feb. 18, 2021  (JP) .................................. 2021-024597

(51) Int. Cl.
*B60W 50/14* (2020.01)
*B60R 11/04* (2006.01)

(52) U.S. Cl.
CPC ............ *B60W 50/14* (2013.01); *B60R 11/04* (2013.01); *B60W 2050/146* (2013.01); *B60W 2420/42* (2013.01); *B60W 2554/4029* (2020.02); *B60W 2554/80* (2020.02); *B60W 2710/30* (2013.01); *B60W 2756/10* (2020.02)

(58) Field of Classification Search
None
See application file for complete search history.

(56) References Cited

U.S. PATENT DOCUMENTS

2019/0135306 A1* 5/2019 Won .................. B60W 30/0956

FOREIGN PATENT DOCUMENTS

WO   2017/056995   4/2017

* cited by examiner

*Primary Examiner* — Thomas S McCormack
(74) *Attorney, Agent, or Firm* — Rankin, Hill & Clark LLP (57) ABSTRACT

A vehicle control device includes a peripheral object recognition unit configured to recognize an object that is present around a vehicle to be controlled, an object state recognition unit configured to recognize, in a situation where a first object and a second object are recognized by the peripheral object recognition unit, states of the first object and the second object including distance between the vehicle to be controlled and the first object, distance between the vehicle to be controlled and the second object, moving direction of the first object, and moving direction of the second object, and a display control unit configured to cause the display device to execute external notification processing for displaying a notification to the first object or the second object based on the states of the first object and the second object recognized by the object state recognition unit.

10 Claims, 8 Drawing Sheets

VEHICLE CONTROL DEVICE AND VEHICLE CONTROL METHOD

INCORPORATION BY REFERENCE

The present application claims priority under 35 U.S.C. § 119 to Japanese Patent Application No. 2021-024597 filed on Feb. 18, 2021. The content of the application is incorporated herein by reference in its entirety.

BACKGROUND OF THE INVENTION

Field of the Invention

The present invention relates to a vehicle control device and a vehicle control method.

Description of the Related Art

Conventionally, a vehicle state display system using a display that displays characters toward the outside of a vehicle to indicate the state and intention of the own vehicle, for a pedestrian, another vehicle, and the like that are present around the own vehicle, has been proposed (see WO2017/056995, for example).

SUMMARY OF THE INVENTION

As in the above-described vehicle state display system, as an aspect for displaying information toward an object outside the vehicle, such as a pedestrian, it is conceivable to display an alert to the object. Then, in a situation where two or more objects are present around the own vehicle, it is desirable to appropriately perform an alert display for each object.

The present invention has been made in view of the above background, and intends to provide a vehicle control device and a vehicle control method that cause the display device to appropriately perform the notification to each object when two or more objects are present around a vehicle to be controlled.

In order to attain the above-described goal, proposed as a first aspect is a vehicle control device that controls a display mode of a display device provided in a vehicle to be controlled and displaying information toward the outside of the vehicle to be controlled. The vehicle control device includes a peripheral object recognition unit configured to recognize an object that is present around the vehicle to be controlled, an object state recognition unit configured to recognize, in a situation where a first object and a second object are recognized by the peripheral object recognition unit, states of the first object and the second object including distance between the vehicle to be controlled and the first object, distance between the vehicle to be controlled and the second object, moving direction of the first object, and moving direction of the second object, and a display control unit configured to cause the display device to execute external notification processing for displaying a notification to the first object or the second object based on the states of the first object and the second object recognized by the object state recognition unit.

In the above-described vehicle control device, the display control unit may be configured to execute the external notification processing when the first object being a pedestrian and the second object being another vehicle other than the vehicle to be controlled are recognized by the peripheral object recognition unit.

In the above-described vehicle control device, the display control unit may be configured not to execute the external notification processing, when the object state recognition unit recognizes that the pedestrian intends to cross in front of the vehicle to be controlled and recognizes that the other vehicle is approaching the vehicle to be controlled from the front of the vehicle to be controlled, and when the object state recognition unit recognizes that the pedestrian is stopped while facing the other vehicle.

In the above-described vehicle control device, the display control unit may be configured to execute the external notification processing for causing the display device to display a notification encouraging the pedestrian to wait, when the object state recognition unit recognizes that the pedestrian intends to cross in front of the vehicle to be controlled, and recognizes that the other vehicle is approaching the vehicle to be controlled from the front of the vehicle to be controlled, and when the object state recognition unit recognizes that the pedestrian is stopped without facing the other vehicle.

In the above-described vehicle control device, the display control unit may be configured to execute the external notification processing for causing the display device to display an alert notification to the pedestrian based on the distance between the vehicle to be controlled and the other vehicle recognized by the object state recognition unit, when the object state recognition unit recognizes that the pedestrian intends to cross in front of the vehicle to be controlled, and recognizes that the other vehicle is approaching the vehicle to be controlled from the front of the vehicle to be controlled.

In the above-described vehicle control device, the display control unit may be configured to change the alert level to the pedestrian depending on the distance between the vehicle to be controlled and the other vehicle in the external notification processing.

In the above-described vehicle control device, the display control unit may be configured to execute the external notification processing for causing the display device to display a notification encouraging the pedestrian to cross, when the object state recognition unit recognizes that the other vehicle has stopped.

In the above-described vehicle control device, the display control unit may be configured to execute the external notification processing for causing the display device to display an alert notification to the other vehicle based on the distance between the vehicle to be controlled and the other vehicle recognized by the object state recognition unit, and turn on a light of the vehicle to be controlled, when the object state recognition unit recognizes that the pedestrian intends to cross in front of the vehicle to be controlled, and recognizes that the other vehicle is approaching the vehicle to be controlled from the front of the vehicle to be controlled.

In the above-described vehicle control device, the display control unit may be configured to execute the external notification processing for causing the display device to display a notification encouraging the pedestrian to cross, when the object state recognition unit recognizes that the pedestrian intends to cross in front of the vehicle to be controlled, and recognizes that the other vehicle is approaching the vehicle to be controlled from the front of the vehicle to be controlled, and when the object state recognition unit recognizes that the other vehicle turns right or turns left before reaching the vehicle to be controlled.

In the above-described vehicle control device, the display control unit may be configured to execute the external notification processing for causing the display device to display a notification encouraging the pedestrian to wait, when the object state recognition unit recognizes that the pedestrian intends to cross behind the vehicle to be controlled, and recognizes that the other vehicle is approaching the vehicle to be controlled from the front of the vehicle to be controlled.

In the above-described vehicle control device, it may be configured in such a manner that, when the peripheral object recognition unit recognizes the first object being a first other vehicle other than the vehicle to be controlled and the second object being a second other vehicle other than the vehicle to be controlled and the first other vehicle, and when the object state recognition unit recognizes that the first other vehicle turns in front of the vehicle to be controlled in a direction approaching the vehicle to be controlled, and the second other vehicle passes from behind the vehicle to be controlled to the side of the vehicle to be controlled in a state where the second other vehicle faces the first other vehicle with the vehicle to be controlled intervening, the display control unit executes the external notification processing for causing the display device to display a notification notifying the passage of the second other vehicle for the first other vehicle.

In order to attain the above-described goal, proposed as a second aspect is a vehicle control method for causing a computer to control a display mode of a display device provided in a vehicle to be controlled and displaying information toward the outside of the vehicle to be controlled. The vehicle control method includes a peripheral object recognition step of recognizing an object that is present around the vehicle to be controlled, an object state recognition step of recognizing, in a situation where a first object and a second object are recognized in the peripheral object recognition step, states of the first object and the second object including distance between the vehicle to be controlled and the first object, distance between the vehicle to be controlled and the second object, moving direction of the first object, and moving direction of the second object, and a display control step of causing the display device to execute external notification processing for displaying a notification to the first object or the second object based on the states of the first object and the second object recognized in the object state recognition step.

According to the above-described vehicle control device, in the situation where two or more objects are present around the vehicle to be controlled, the display device can appropriately perform the notification to respective objects.

DETAILED DESCRIPTION OF THE PREFERRED EMBODIMENTS

1. Configuration of Vehicle

An exemplary configuration of a vehicle 1 on which a vehicle control device 10 of the present embodiment is installed will be described with reference to FIG. 1. The vehicle 1 is a four-wheeled vehicle, and corresponds to a vehicle to be controlled in the present disclosure. Hereinafter, the vehicle 1 is referred to as own vehicle 1.

A front camera 40 that captures an image of the front of the own vehicle 1, a front radar 44 that detects the position of an object that is present on the front side of the own vehicle 1, a horn 48, a front display device 50 that displays information toward the front of the own vehicle 1, and headlights 65*a* and 65*b* are provided at a front part of the own vehicle 1. A front shade 51 is disposed on the front surface of the front display device 50. By switching the orientation of the front shade 51 to the left or right, the display direction of the front display device 50 can be switched between the left direction and the right direction.

For example, when the front shade 51 is turned to the left, a pedestrian positioned on the front left side of the own vehicle 1 can be targeted as an object of notification by the front display device 50. At this time, a driver of an oncoming vehicle cannot visually recognize the display of the front display device 50. Further, when the front shade 51 is turned to the right, for example, an oncoming vehicle approaching the own vehicle 1 from the front of the own vehicle 1 can be targeted as an object of notification by the front display device 50. At this time, a pedestrian positioned on the front left side of the own vehicle 1 cannot visually recognize the display by the front display device 50.

A rear camera 43 that captures an image of the rear of the own vehicle 1, a rear radar 47 that detects the position of an object that is present on the rear side of the own vehicle 1, and a rear display device 60 that displays information toward the rear of the own vehicle 1 are provided at a rear part of the own vehicle 1. Like the front display device 50, a rear shade 61 (see FIG. 2) is disposed on the front surface of the rear display device 60. By switching the orientation of the rear shade 61 to the left or right, the display direction of the rear display device 60 can be switched between the left direction and the right direction.

A right-side camera 41 that captures an image of the right side of the own vehicle 1 and a right-side radar 45 that detects the position of an object that is present on the right side of the own vehicle 1 are provided at a right-side part of the own vehicle 1. A left-side camera 42 that captures an image of the left side of the own vehicle 1 and a left-side radar 46 that detects the position of an object that is present on the left side of the own vehicle 1 are provided at a left-side part of the own vehicle 1.

Further, a navigation device 70 and a communication unit 80 are provided in the own vehicle 1. The navigation device 70 includes a global navigation satellite system (GNSS) sensor 71, which detects the position of the own vehicle 1 by receiving radio waves transmitted from a plurality of navigation satellites toward the ground, and map data 72, and is configured to execute route guidance to destinations or the like. The communication unit 80 communicates with other vehicles, external servers, roadside units and the like. The own vehicle 1 may be configured to include cameras and radars arranged at the four corners thereof.

2. Configuration of Vehicle Control Device

An exemplary configuration of the vehicle control device 10 will be described with reference to FIG. 2. The vehicle control device 10 is a control unit configured by a processor 20, a memory 30, an interface circuit (not illustrated), and the like. Images captured by the front camera 40, the right-side camera 41, the left-side camera 42, and the rear camera 43 and object position detection data obtained by the front radar 44, the right-side radar 45, the left-side radar 46, and the rear radar 47 are input to the vehicle control device 10.

Operations of the horn 48, the front display device 50, the front shade 51, the rear display device 60, the rear shade 61, and the headlights 65a and 65b are controlled by control signals output from the vehicle control device 10. The vehicle control device 10 performs data communication with the navigation device 70 to recognize the position of the own vehicle 1, conditions of surrounding roads, and the like. The vehicle control device 10 communicates with other vehicles or the like via the communication unit 80.

The processor 20 functions as a peripheral object recognition unit 21, an object state recognition unit 22, and a display control unit 23 by reading and executing a control program 31 stored in the memory 30. The processor 20 corresponds to a computer of the present disclosure. Processing to be executed by the peripheral object recognition unit 21 corresponds to a peripheral object recognition step in a vehicle control method of the present disclosure. Processing to be executed by the object state recognition unit 22 corresponds to an object recognition step in the vehicle control method of the present disclosure. Processing to be executed by the display control unit 23 corresponds to a display control step in the vehicle control method of the present disclosure.

The peripheral object recognition unit 21 recognizes an object such as a pedestrian, another vehicle, or the like, which is present around the own vehicle 1, based on the images captured by the front camera 40, the right-side camera 41, the left-side camera 42, and the rear camera 43, and the object position detection data obtained by the front radar 44, the right-side radar 45, the left-side radar 46, and the rear radar 47.

The object state recognition unit 22 recognizes the state of the object recognized by the peripheral object recognition unit 21 based on the object image captured by the front camera 40, the right-side camera 41, the left-side camera 42, or the rear camera 43, and the object detection position obtained by the front radar 44, the right-side radar 45, the left-side radar 46, or the rear radar 47. In the present embodiment, the object state recognition unit 22 recognizes, as states of the object, distance between the own vehicle 1 and the object, moving direction of the object, orientation of a pedestrian when the object is the pedestrian, and the like.

When a first object and a second object are recognized by the peripheral object recognition unit, the display control unit 23 executes external notification processing in which notification is performed by the front display device 50 or the rear display device 60, for the first object or the second object. In the external notification processing, the display control unit 23 determines the content of notification to be performed by the front display device 50 or the rear display device 60 for the first object or the second object, based on the states of the first object and the second object recognized by the object state recognition unit 22.

3. External Notification Processing

A series of processing to be executed by the vehicle control device 10, including recognition of an object that is present around the own vehicle 1 and execution of the external notification processing, will be described with reference to flowcharts illustrated in FIGS. 3 to 4. Hereinafter, as illustrated in FIG. 5, a situation where a pedestrian P intending to cross in front of the own vehicle 1 is recognized as the first object and another vehicle V approaching the own vehicle 1 from the front of the own vehicle 1 is present as the second object will be described.

Figure 3:
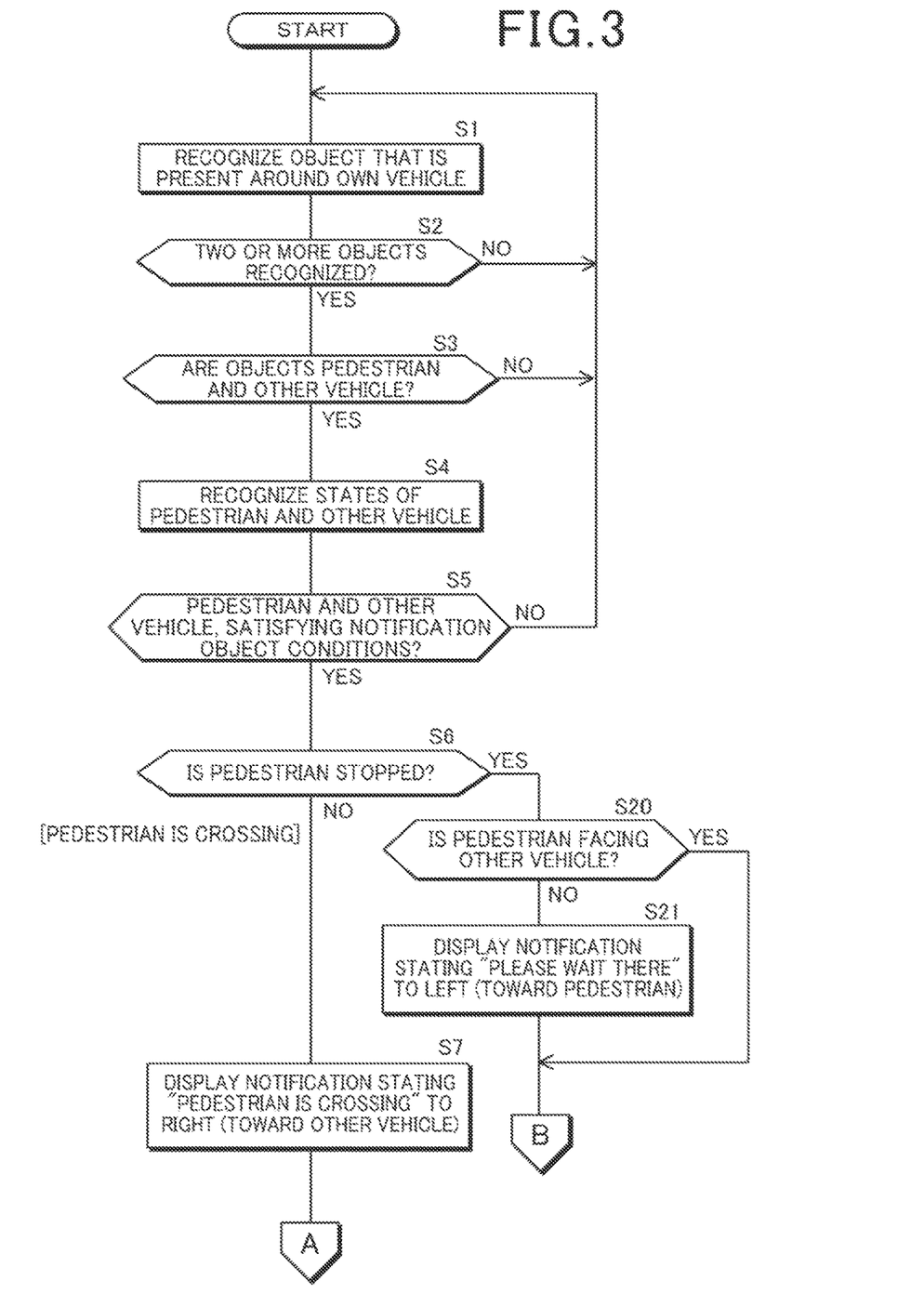
FIG. 3 is a first flowchart illustrating external notification processing.

In step S1 of FIG. 3, the peripheral object recognition unit 21 recognizes an object that is present around the own vehicle 1 based on images captured by the front camera 40, the right-side camera 41, the left-side camera 42, and the rear camera 43 and object position detection data obtained by the front radar 44, the right-side radar 45, the left-side radar 46, and the rear radar 47. Subsequently, in step S2, if the peripheral object recognition unit 21 recognizes two or more objects, the processing proceeds to step S3. If the recognition of two or more objects is negated, the processing returns to step S1.

In step S3, if a pedestrian and another vehicle are objects recognized by the peripheral object recognition unit 21, the processing proceeds to step S4. If the recognized objects are not a pedestrian and another vehicle, the processing returns to step S1. In step S4, the object state recognition unit 22 recognizes states of the pedestrian and the other vehicle recognized by the peripheral object recognition unit 21. According to the example of FIG. 5, the object state recognition unit 22 recognizes the states of the pedestrian P and the other vehicle V based on the images of the pedestrian P and the other vehicle V extracted from images captured by the front camera 40 and the positions of the pedestrian P and the other vehicle V detected by the front radar 44.

More specifically, the object state recognition unit 22 recognizes the following items (1) to (7) as the states of the pedestrian P and the other vehicle V.
(1) Distance between the pedestrian P and the own vehicle 1.
(2) Direction of movement of the pedestrian P.
(3) Moving speed of the pedestrian P.
(4) Orientation of the pedestrian P.
(5) Distance between the other vehicle V and the own vehicle 1.
(6) Direction of movement of the other vehicle V.
(7) Moving speed of the other vehicle V.

The moving direction and moving speed of the pedestrian P can be recognized based on a change in position of the pedestrian P detected by the front radar 44, or a change in image of the pedestrian P extracted from images captured by the front camera 40. The same applies to the moving direction and moving speed of the other vehicle V.

In subsequent step S5, the display control unit 23 determines whether the pedestrian P and the other vehicle V satisfy notification object conditions. In the present embodiment, the following conditions (a) to (d) are the notification object conditions to be satisfied at the same time.

(a) The distance between the pedestrian P and the own vehicle 1 is equal to or less than a first predetermined distance (e.g., 5 m).

(b) The distance between the other vehicle V and the own vehicle 1 is equal to or less than a second predetermined distance (e.g., 10 m).

(c) The pedestrian P is facing toward the road side.

(d) The other vehicle V is approaching toward the own vehicle 1.

When the display control unit 23 determines that the pedestrian P and the other vehicle V satisfy the notification object conditions, the processing proceeds to step S6. On the other hand, if the display control unit 23 determines that the pedestrian P and the other vehicle V do not satisfy the notification object conditions, the processing returns to step S1. In this case, external display processing is not executed in step S6 and following steps.

In step S6, the display control unit 23 determines whether the pedestrian P is stopped. Then, if the display control unit 23 determines that the pedestrian P is stopped, the processing proceeds to step S20. If the pedestrian P is not stopped (crossing the road), the processing proceeds to step S7. In step S20, the display control unit 23 determines whether the pedestrian P is facing the other vehicle V by recognizing the orientation of the face of the pedestrian P from the image of the pedestrian P.

Figure 4:
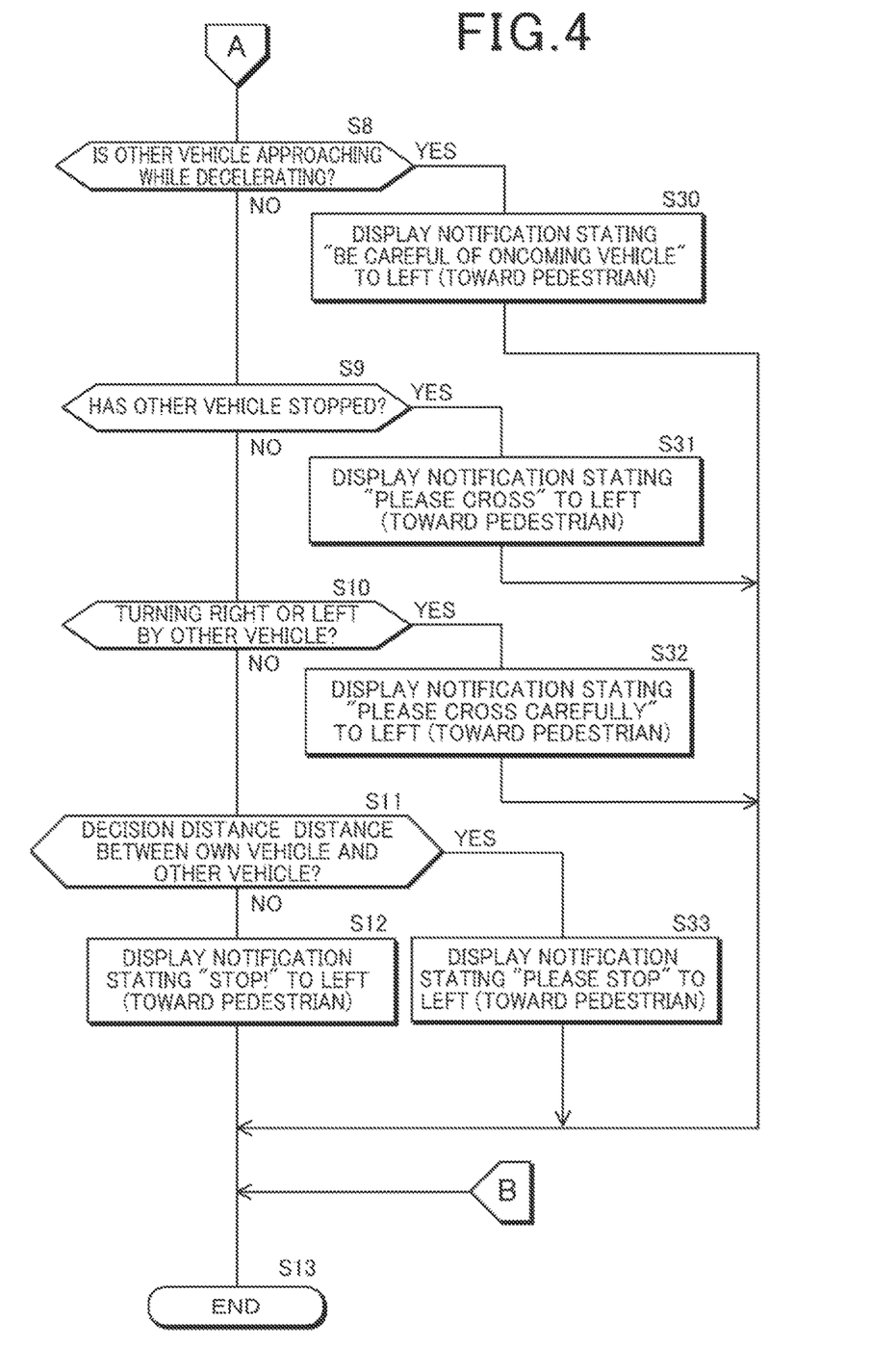
FIG. 4 is a second flowchart illustrating the external notification processing.
Figure 5:
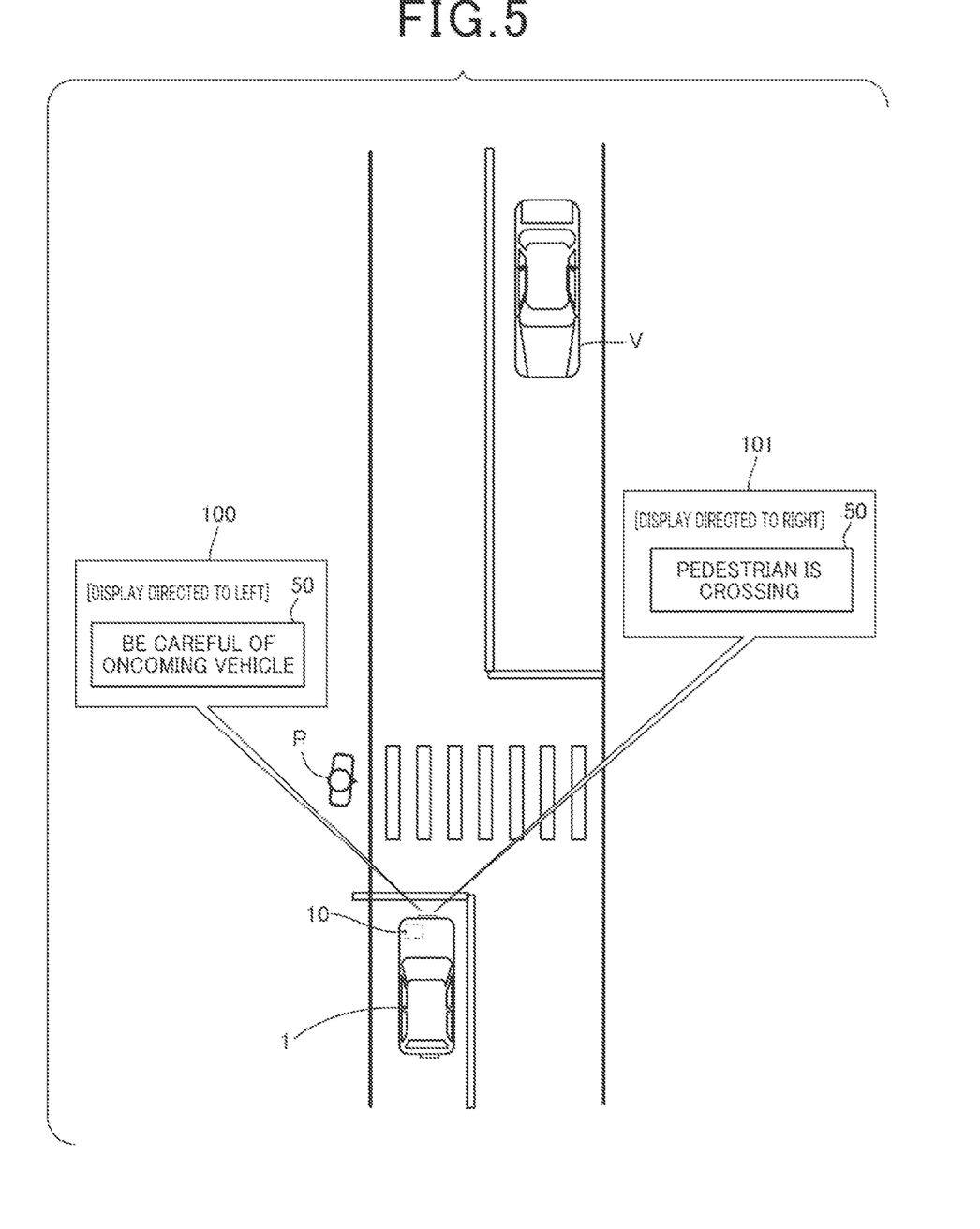
FIG. 5 is an explanatory diagram of a notification by a display device in a situation where another vehicle approaches the own vehicle and a pedestrian intends to cross in front of the own vehicle.

Then, the display control unit 23 determines that the pedestrian P is facing the other vehicle V, the processing proceeds to step S13 in FIG. 4. In this case, the display control unit 23 does not perform notification to the pedestrian P by the front display device 50. As a result, performing annoying notification to the pedestrian P who is aware of the other vehicle V and is waiting can be avoided. On the other hand, when the display control unit 23 determines that the pedestrian P is not facing the other vehicle V, the processing proceeds to step S21 in which the front shade 51 is turned to the left and causes the front display device 50 to display a notification stating "Please wait there". Then, the processing proceeds to step S13 of FIG. 4. As a result, it is possible to encourage the pedestrian P to wait for a while.

In step S7, the display control unit 23 turns the front shade 51 to the right and causes the front display device 50 to display a notification 101 stating "Pedestrian is crossing", as illustrated in FIG. 5. As a result, the state where the pedestrian P intends to cross can be notified to a driver of the other vehicle V. Further, when the distance between the own vehicle 1 and the other vehicle V is equal to or less than the predetermined distance, the display control unit 23 turns on the headlights 65a and 65b or another light (not illustrated) of the own vehicle 1, in addition to the display of the notification 101 by the front display device 50, thereby performing more intensified alerting to the driver of the other vehicle V.

In subsequent step S8 of FIG. 4, the display control unit 23 determines whether the state where the other vehicle V is approaching while decelerating is recognized by the object state recognition unit 22. Then, when the display control unit 23 determines that the other vehicle V is approaching while decelerating, the processing proceeds to step S30. When the other vehicle V is not decelerating, the processing proceeds to step S9. In step S30, the display control unit 23 turns the front shade 51 to the left and causes the front display device 50 to display a notification 100 stating "Be careful of an oncoming vehicle". Then, the processing proceeds to step S13. As a result, it is possible to encourage the pedestrian P to carefully cross the road while watching the other vehicle V.

In step S9, the display control unit 23 determines whether the state where the other vehicle V has stopped is recognized by the object state recognition unit 22. Then, when the display control unit 23 determines that the other vehicle V has stopped, the processing proceeds to step S31. When it is determined that the other vehicle V is not stopped, the processing proceeds to step S10. In step S31, the display control unit 23 turns the front shade 51 to the left and causes the front display device 50 to display a notification stating "Please cross", then the processing proceeds to step S13. As a result, it is possible to encourage the pedestrian P to cross the road.

In step S10, the display control unit 23 determines whether the state where the other vehicle V turns right or turns left before reaching the position of the own vehicle 1 is recognized by the object state recognition unit 22. Then, when the display control unit 23 determines that the other vehicle V turns right or turns left, the processing proceeds to step S32. When it is determined that the other vehicle V does not turn right or left, the processing proceeds to step S11. In step S32, the display control unit 23 turns the front shade 51 to the left and causes the front display device 50 to display a notification stating "Please cross carefully". Then, the processing proceeds to step S13.

Figure 6:
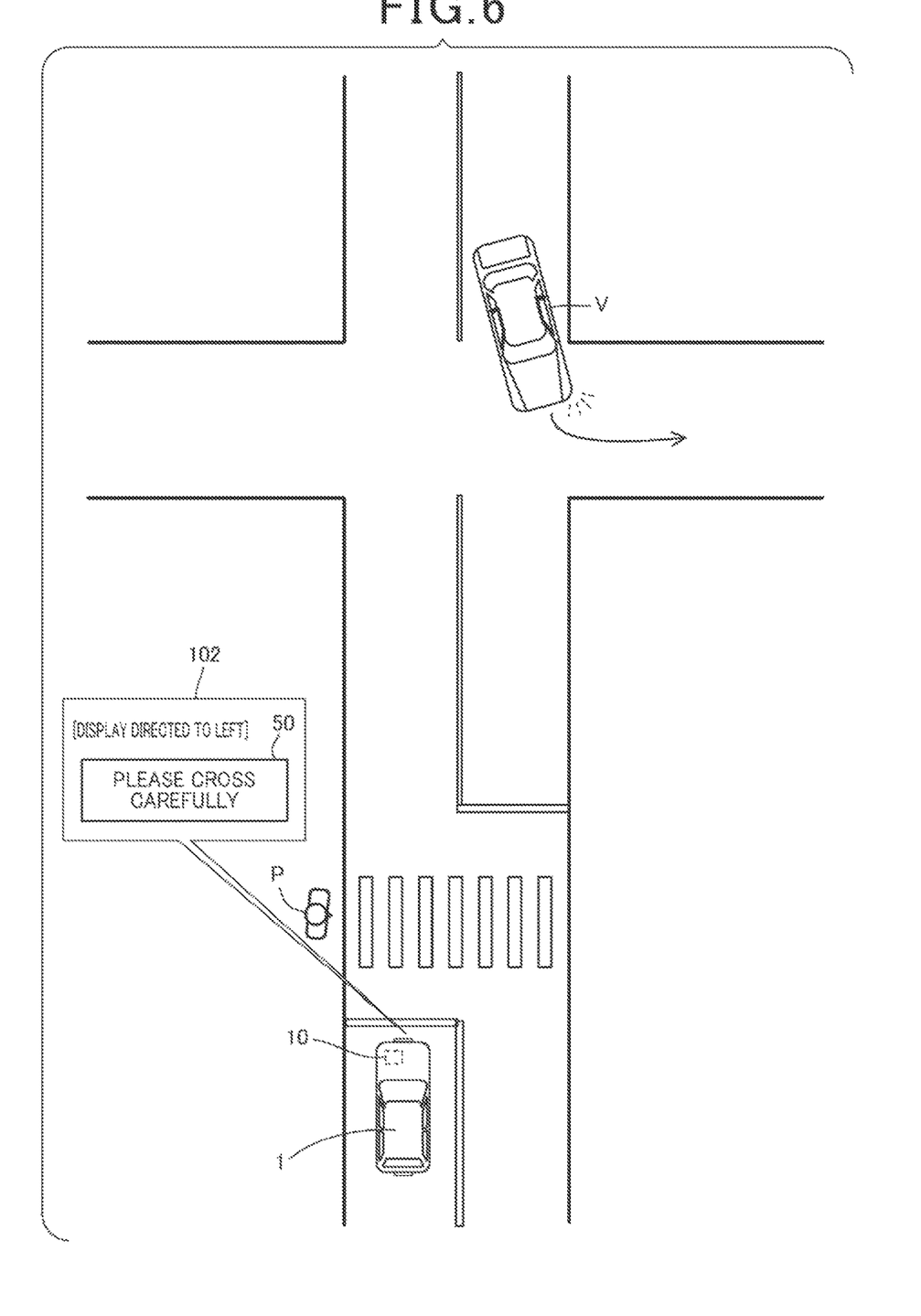
FIG. 6 is an explanatory diagram of a notification by the display device in a situation where another vehicle turns left before reaching the own vehicle.

FIG. 6 exemplarily illustrates the situation where the other vehicle V turns right before reaching the position of the own vehicle 1. In this case, since the other vehicle V turns right, the other vehicle V does not prevent the pedestrian P from crossing. Therefore, by displaying a notification 102 stating "Please cross carefully" on the front display device 50, it is possible to encourage the pedestrian P to cross the road. The fact that the other vehicle V turns right or turns left can be identified by recognizing the behavior of the other vehicle V from the image captured by the front camera 40, or by recognizing the blinking of the turn signal of the other vehicle V. Further, the turning right or turning left of the other vehicle V may be recognized through a vehicle-to-vehicle communication between the other vehicle V and the own vehicle 1 that enables receiving information notifying the turning right or turning left of the other vehicle V.

In step S11, the display control unit 23 determines whether the distance between the other vehicle V and the own vehicle 1 recognized by the object state recognition unit 22 is equal to or greater than a decision distance (e.g., 10 m). When the display control unit 23 determines that the distance between the other vehicle V and the own vehicle 1 is equal to or greater than the decision distance, the processing proceeds to step S33. When it is determined that the distance between the other vehicle V and the own vehicle 1 is less than the decision distance, the processing proceeds to step S12.

In step S33, the display control unit 23 turns the front shade 51 to the left and causes the front display device 50 to display a notification stating "Please stop". Then, the processing proceeds to step S13. As a result, it is possible to encourage the pedestrian P to wait to cross the road. Further, in step S12, the display control unit 23 turns the front shade 51 to the left and causes the front display device 50 to display a notification emphasizing the stop, such as "Stop!". Then, the processing proceeds to step S13. As a result, it is possible to more strongly encourage the pedestrian P to wait to cross the road by raising an alert level for the pedestrian P, in the situation where the other vehicle V is approaching the own vehicle 1. Further, in addition to the emphasized display "Stop!", the alert level for the pedestrian P may be further raised by executing a whistling operation using the horn 48.

4. Other Embodiments

Figure 7:
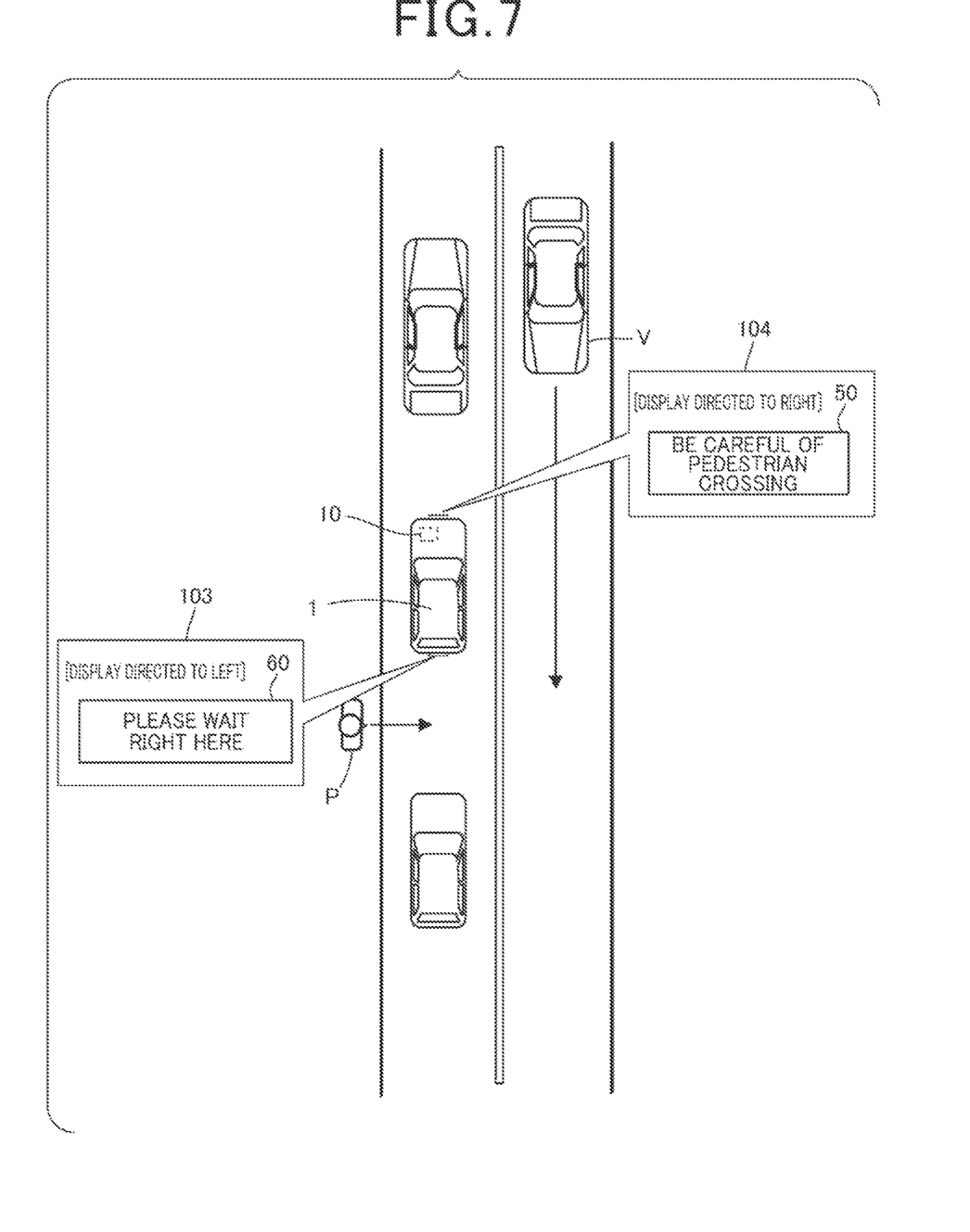
FIG. 7 is an explanatory diagram of a notification by the display device in a situation where another vehicle approaches the own vehicle and a pedestrian intends to cross behind the own vehicle.

In the above-described embodiment, as illustrated in FIGS. 5 and 6, the exemplary case in which the display control unit 23 causes the front display device 50 to display the notification in the case of recognizing the presence of both the pedestrian P and the other vehicle V positioned in front of the own vehicle 1 has been described. As another embodiment, as illustrated in FIG. 7, when the object state recognition unit 22 recognizes a situation where the other vehicle V is approaching the own vehicle 1 from the front of the own vehicle 1 and the pedestrian P intends to cross behind the own vehicle 1, the display control unit 23 may execute external notification processing for displaying notification to the pedestrian P and the other vehicle V.

In this case, the display control unit 23 turns the rear shade 61 to the left and causes the rear display device 60 to display a notification stating "Please wait right here" for the pedestrian P. Further, for the other vehicle V, the display control unit 23 turns the front shade 51 to the right and causes the front display device 50 to display a notification 104 stating "Be careful of pedestrian crossing". As a result, it is possible to encourage the pedestrian P to wait until the other vehicle V, which is hidden behind the own vehicle 1 and difficult to visually recognize, passes. Further, it is possible to encourage the driver of the other vehicle V to pay attention to the pedestrian P possibly appearing from behind the own vehicle 1.

Figure 8:
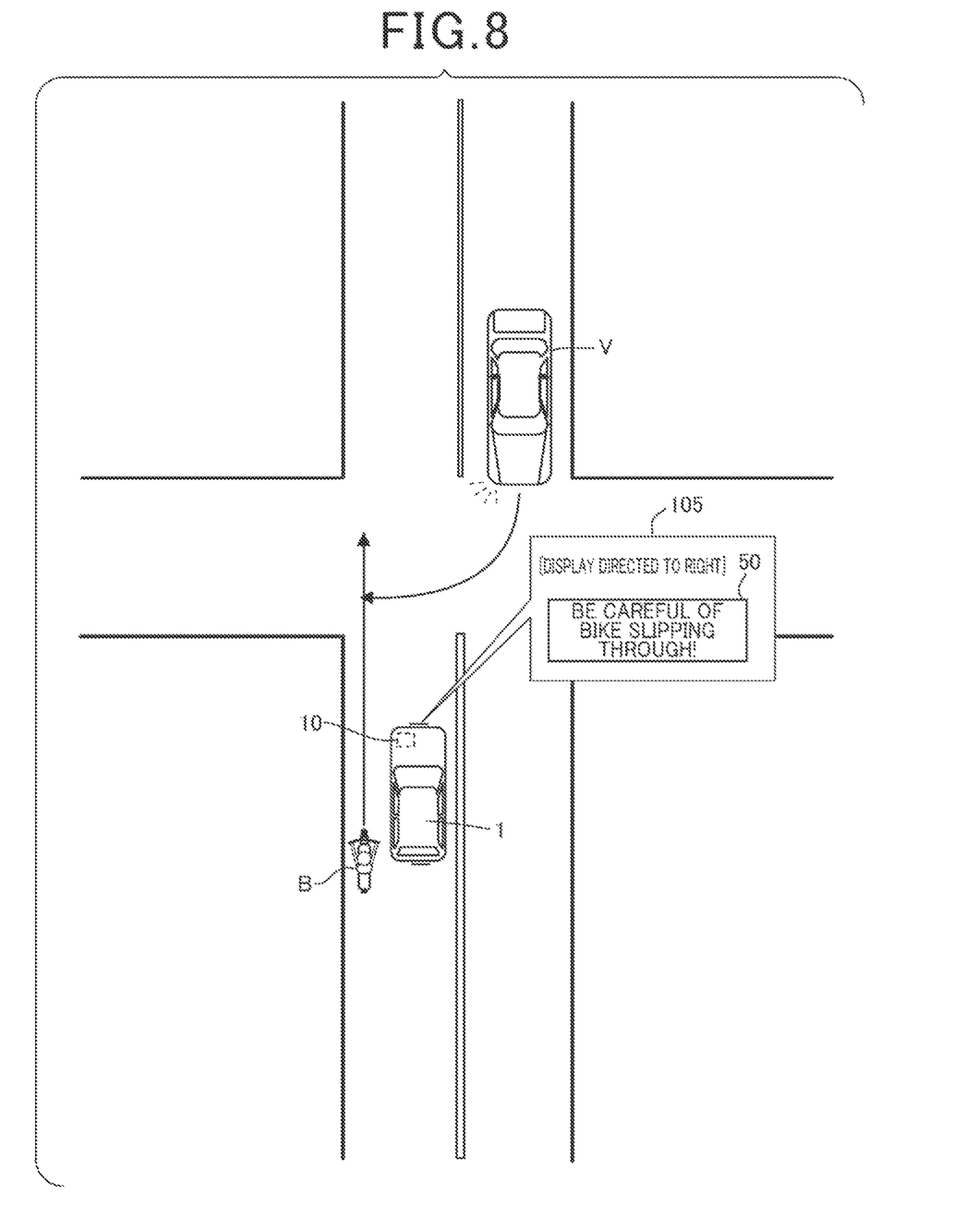
FIG. 8 is an explanatory diagram of a notification by the display device in a situation where another vehicle turns right in front of the own vehicle and a two-wheeled vehicle slips through the left side of the own vehicle.

Further, as illustrated in FIG. 8, in a situation where the peripheral object recognition unit 21 recognizes a two-wheeled vehicle B and another vehicle V, and the object state recognition unit 22 recognizes that the two-wheeled vehicle B slips through the left side of the own vehicle 1 and moves to the front of the own vehicle 1 and the other vehicle V turns right in front of the own vehicle 1, the display control unit 23 may execute external display processing.

In the situation of FIG. 8, the other vehicle V corresponds to a first other vehicle of the present disclosure, and the two-wheeled vehicle B corresponds to a second other vehicle. The other vehicle V is trying to turn to the left direction, which is the direction in which the other vehicle V approaches the own vehicle 1, and the two-wheeled vehicle B is trying to pass from the rear of the own vehicle 1 to the side of the own vehicle 1, in a state where it faces the other vehicle V with the own vehicle 1 intervening therebetween.

In this case, the display control unit 23 performs external display processing for turning the front shade 51 to the right and causing the front display device 50 to display a notification 105 stating "Be careful of bike slipping through!". As a result, it becomes possible to enable the driver of the other vehicle V to recognize the presence of the two-wheeled vehicle B that is hidden behind the own vehicle 1 and is difficult for the driver of the other vehicle V to visually recognize, thereby preventing the other vehicle V and the two-wheeled vehicle B from coming into contact with each other. Honking the horn 48 may be useful to encourage a driver of the two-wheeled vehicle B to pay attention to the other vehicle V that turns right.

In the above-described embodiment, the front shade 51 is arranged on the front display device 50 and the rear shade 61 is arranged on the front surface of the rear display device 60, so that the display directions of the front display device 50 and the rear display device 60 can be switched between the left and the right. As another embodiment, a configuration in which the front shade 51 and the rear shade 61 are omitted may be adopted. Alternatively, a configuration not using the shades may be adopted to switch the display directions of the front display device 50 and the rear display device 60. Further, for example, a (dual-view display) system that causes the front display device 50 to differentiate the content to be displayed when seen from the left side and when seen from the right side may be adopted. It may also be possible to display the screen of the front display device 50 inclinedly.

In the above-described embodiment, the display of the notification by the front display device 50 is changed depending on the affirmation or denial of the conditions in steps S6, S20, and steps S8 to S11 in the flowcharts of FIGS. 3 and 4. Alternatively, the affirmation or denial in some but not all of these conditions may be referred to in the determination.

In the above-described embodiment, the vehicle control method of the present disclosure is executed by the processor 20 (corresponds to the computer of the present disclosure) provided in the vehicle control device 10. However, a computer or the like that configures an external server that communicates with the vehicle 1 may be configured to execute the vehicle control method of the present disclosure. In this case, information about an object that is present around the vehicle 1 is transmitted from the vehicle 1 to the external server, and instructive information about the notification to be displayed on the front display device 50 and the rear display device 60 is transmitted from the external server to the vehicle 1. Further, a configuration in which the peripheral object recognition unit 21, the object state recognition unit 22, and the display control unit 23 are arranged in the vehicle control device 10 and the external server in a scattered manner may be adopted.

Figure 1:
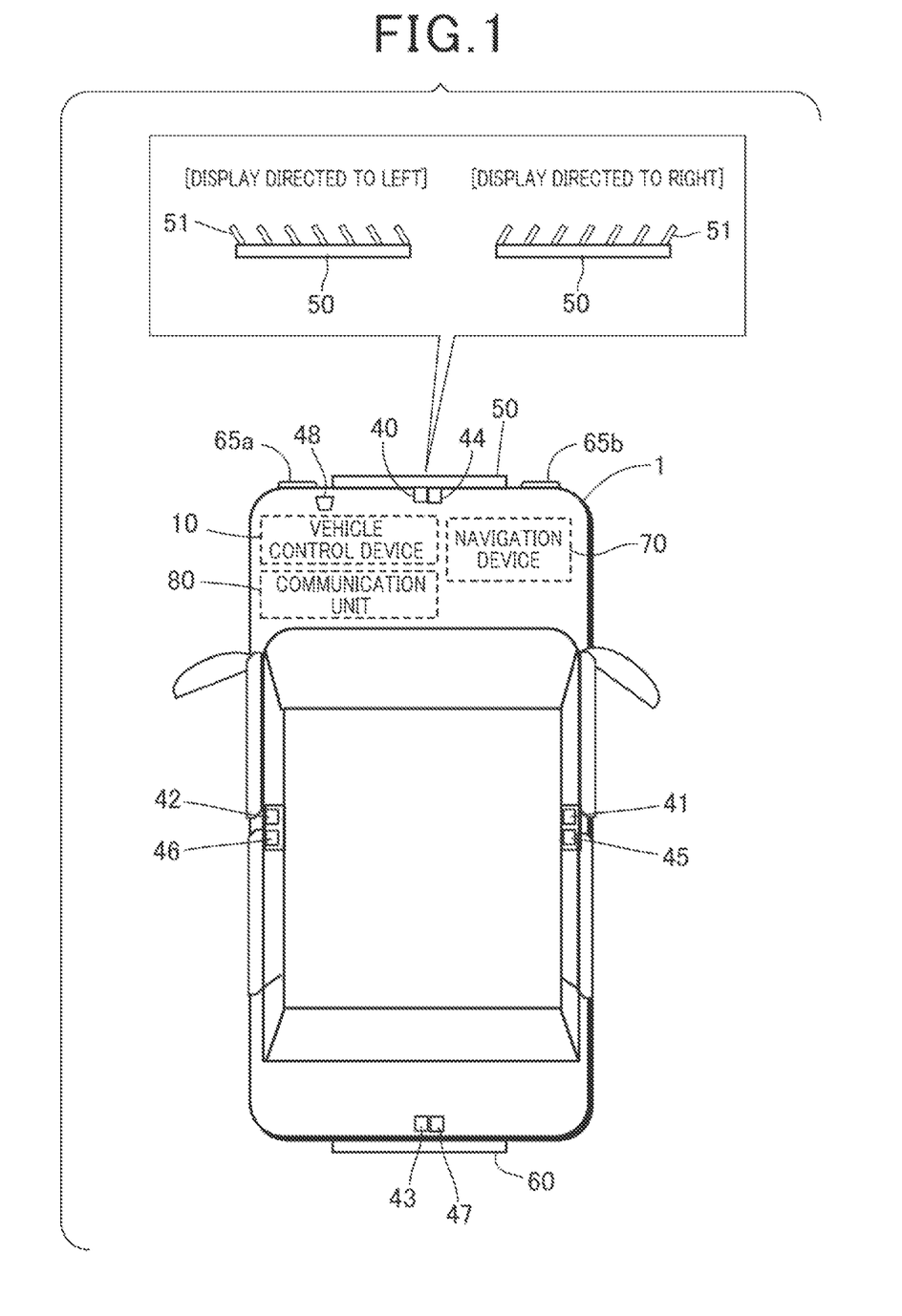
FIG. 1 is a diagram illustrating an exemplary configuration of a vehicle on which a vehicle control device is installed.
Figure 2:
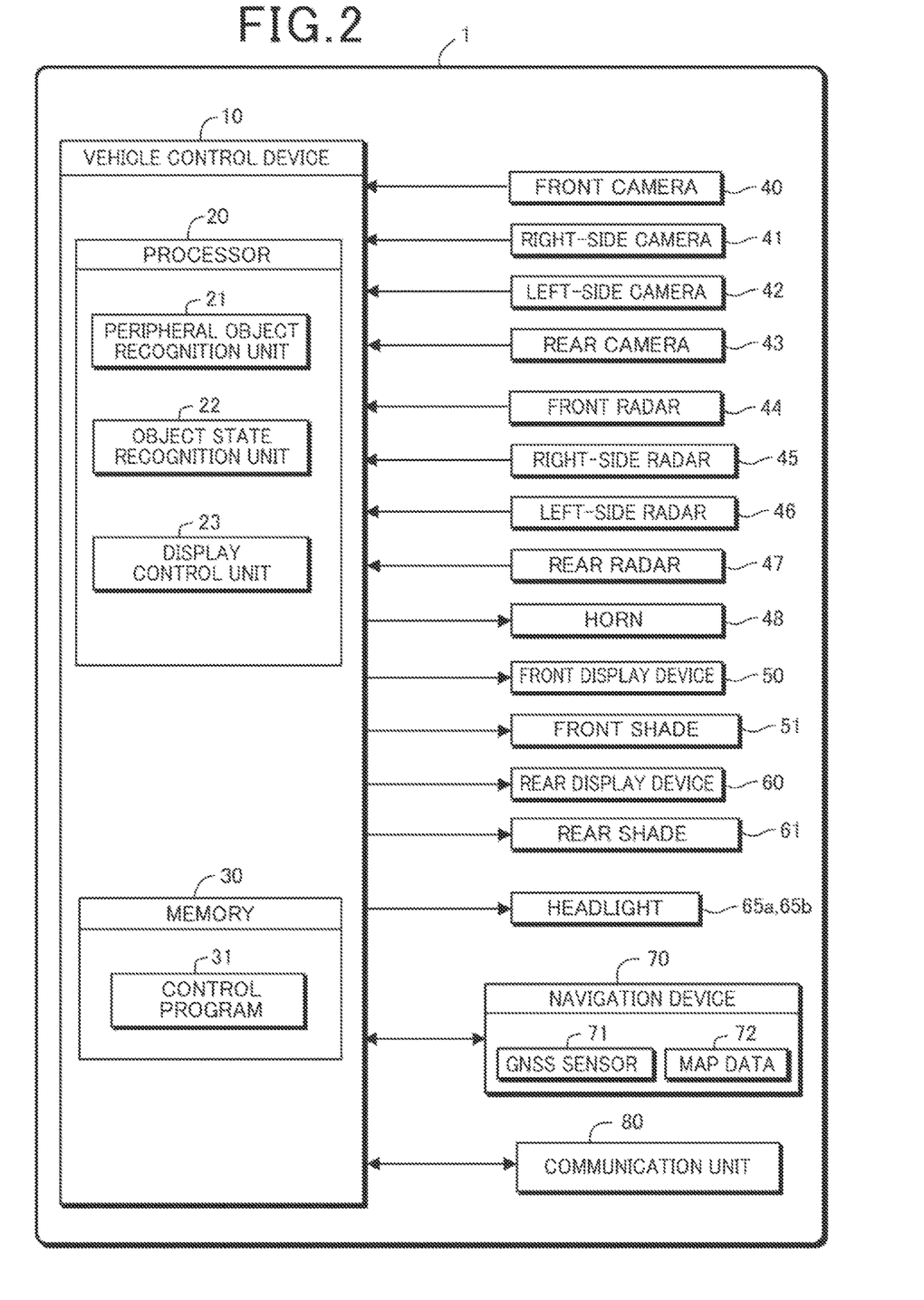
FIG. 2 is a diagram illustrating an exemplary configuration of the vehicle control device.

FIGS. 1 and 2 are schematic diagrams illustrating configurations of the vehicle 1 and the vehicle control device 10 that are divided depending on main processing contents, in order to facilitate the understanding of the present invention. The configurations of the vehicle 1 and the vehicle control device 10 may be differently dissected. Further, the processing of each constituent component may be executed by a single hardware unit or may be executed by a plurality of hardware units. Further, the processing of each constituent component in the flowcharts illustrated in FIGS. 3 and 4 may be executed by a single program or may be executed by a plurality of programs.

5. Configurations Supported by the Above-Described Embodiments

The above-described embodiments are specific examples of the following configurations.

(Item 1)

A vehicle control device that controls a display mode of a display device provided in a vehicle to be controlled and displaying information toward the outside of the vehicle to be controlled. The vehicle control device includes a peripheral object recognition unit configured to recognize an object that is present around the vehicle to be controlled, an object state recognition unit configured to recognize, in a situation where a first object and a second object are recognized by the peripheral object recognition unit, states of the first object and the second object including distance between the vehicle to be controlled and the first object, distance between the vehicle to be controlled and the second object, moving direction of the first object, and moving direction of the second object, and a display control unit configured to cause the display device to execute external notification processing for displaying a notification to the first object or the second object based on the states of the first object and the second object recognized by the object state recognition unit.

According to the vehicle control device of the item 1, in the situation where two or more objects are present around the vehicle to be controlled, it is possible to appropriately perform the display for the object by the display device.

(Item 2)

The vehicle control device according to the item 1, wherein the display control unit executes the external notification processing when the first object being a pedestrian and the second object being another vehicle other than the vehicle to be controlled are recognized by the peripheral object recognition unit.

According to the vehicle control device of the item 2, when another vehicle and the pedestrian that are present around the vehicle to be controlled are recognized, it is possible to appropriately perform the notification to the pedestrian or the other vehicle by the display device.

(Item 3)

The vehicle control device according to the item 2, wherein the display control unit does not execute the external notification processing when the object state recognition unit recognizes that the pedestrian intends to cross in front of the vehicle to be controlled and recognizes that the other vehicle is approaching the vehicle to be controlled from the front of the vehicle to be controlled, and when the object state recognition unit recognizes that the pedestrian is stopped while facing the other vehicle.

According to the vehicle control device of the item 3, since the pedestrian is stopped while facing the other vehicle, it is possible to prevent annoying notification from being performed for the pedestrian by not executing the external notification processing, when it is estimated that the pedestrian recognizes the approach of the other vehicle.

(Item 4)

The vehicle control device according to item 2 or item 3, wherein the display control unit executes the external notification processing for causing the display device to display a notification encouraging the pedestrian to wait, when the object state recognition unit recognizes that the pedestrian intends to cross in front of the vehicle to be controlled, and recognizes that the other vehicle is approaching the vehicle to be controlled from the front of the vehicle to be controlled, and when the object state recognition unit recognizes that the pedestrian is stopped without facing the other vehicle.

According to the vehicle control device of the item 4, since the pedestrian is stopped without facing the other vehicle, it is possible to encourage the pedestrian to wait to cross in the situation where the pedestrian is not aware of the other vehicle approaching can be estimated.

(Item 5)

The vehicle control device according to any one of the second to fourth items, wherein the display control unit executes the external notification processing for causing the display device to display an alert notification to the pedestrian based on the distance between the vehicle to be controlled and the other vehicle recognized by the object state recognition unit, when the object state recognition unit recognizes that the pedestrian intends to cross in front of the vehicle to be controlled, and recognizes that the other vehicle is approaching the vehicle to be controlled from the front of the vehicle to be controlled.

According to the vehicle control device of the item 5, it is possible to perform the notification to the pedestrian by the display device, considering the degree of influence of the other vehicle on the pedestrian, which varies depending on the distance between the vehicle to be controlled and the other vehicle.

(Item 6)

The vehicle control device according to the item 5, wherein the display control unit changes the alert level to the pedestrian depending on the distance between the vehicle to be controlled and the other vehicle in the external notification processing.

According to the vehicle control device of the item 6, it is possible to enable the pedestrian to recognize the situation where the other vehicle is approaching, depending on the difference in alert level.

(Item 7)

The vehicle control device according to the item 5 or the item 6, wherein the display control unit executes the external notification processing for causing the display device to display a notification encouraging the pedestrian to cross, when the object state recognition unit recognizes that the other vehicle has stopped.

According to the vehicle control device of the item 7, it is possible to encourage the forward pedestrian to cross, when the other vehicle stops and the influence on the pedestrian decreases.

(Item 8)

The vehicle control device according to any one of the items 2 to 7, wherein the display control unit executes the external notification processing for causing the display device to display an alert notification to the other vehicle based on the distance between the vehicle to be controlled and the other vehicle recognized by the object state recognition unit and turns on a light of the vehicle to be controlled, when the object state recognition unit recognizes that the pedestrian intends to cross in front of the vehicle to be controlled, and recognizes that the other vehicle is approaching the vehicle to be controlled from the front of the vehicle to be controlled.

According to the vehicle control device of the item 8, it is possible to enhance the alerting effect to the other vehicle by combining the alert display by the display device and the turning-on of the light.

(Item 9)

The vehicle control device according to any one of the items 2 to 8, wherein the display control unit executes the external notification processing for causing the display device to display a notification encouraging the pedestrian to cross, when the object state recognition unit recognizes that the pedestrian intends to cross in front of the vehicle to be controlled, and recognizes that the other vehicle is approaching the vehicle to be controlled from the front of the vehicle to be controlled, and when the object state recognition unit recognizes that the other vehicle turns right or turns left before reaching the vehicle to be controlled.

According to the vehicle control device of the item 9, it is possible to encourage the pedestrian to cross in the situation where the other vehicle turns right or turns left before reaching the vehicle to be controlled, because there is no influence of the other vehicle on the pedestrian.

(Item 10)

The vehicle control device according to any one of items 2 to 9, wherein the display control unit executes the external notification processing for causing the display device to display a notification encouraging the pedestrian to wait, when the object state recognition unit recognizes that the pedestrian intends to cross behind the vehicle to be controlled, and recognizes that the other vehicle is approaching the vehicle to be controlled from the front of the vehicle to be controlled.

According to the vehicle control device of the item 10, it is possible to encourage the pedestrian to wait to cross, in the situation where the pedestrian is positioned behind the vehicle to be controlled and therefore it is hard to notice the other vehicle approaching the vehicle to be controlled from the front of the vehicle to be controlled.

(Item 11)

The vehicle control device according to any one of the items 1 to 10, wherein when the peripheral object recognition unit recognizes the first object being a first other vehicle other than the vehicle to be controlled and the second object being a second other vehicle other than the vehicle to be controlled and the first other vehicle, and when the object state recognition unit recognizes that the first other vehicle turns in front of the vehicle to be controlled in a direction approaching the vehicle to be controlled, and the second other vehicle passes from behind the vehicle to be controlled to the side of the vehicle to be controlled in a state where the second other vehicle faces the first other vehicle with the vehicle to be controlled intervening, the display control unit executes the external notification processing for causing the display device to display a notification notifying the passage of the second other vehicle for the first other vehicle.

According to the vehicle control device of the item 11, it is possible to prevent the first other vehicle and the second other vehicle from coming into contact with each other, by notifying the first other vehicle of the presence of the second other vehicle passing by the side of the vehicle to be controlled.

(Item 12)

A vehicle control method for causing a computer to control a display mode of a display device provided in a vehicle to be controlled and displaying information toward the outside of the vehicle to be controlled. The vehicle control method includes a peripheral object recognition step of recognizing an object that is present around the vehicle to be controlled, an object state recognition step of recognizing, in a situation where a first object and a second object are recognized in the peripheral object recognition step, states of the first object and the second object including distance between the vehicle to be controlled and the first object, distance between the vehicle to be controlled and the second object, moving direction of the first object, and moving direction of the second object, and a display control step of causing the display device to execute external notification processing for displaying a notification to the first object or the second object based on the states of the first object and the second object recognized in the object state recognition step.

When the computer executes the vehicle control method of the item 12, the same operations and effects as the vehicle control device of the item 1 can be obtained.

Reference Signs List

1 Vehicle (vehicle to be controlled)
10 Vehicle control device
20 Processor
21 Peripheral object recognition unit
22 Object state recognition unit
23 Display control unit
30 Memory
31 Control program
40 Front camera
41 Right-side camera
42 Left-side camera
43 Rear camera
44 Front radar
45 Right-side radar
46 Left-side radar
47 Rear radar
48 Horn
50 Front display device
51 Front shade
60 Rear display device
61 Rear shade
P User
V Other vehicle
B Two-wheeled vehicle

What is claimed is:

1. A vehicle control device that controls a display mode of a display device provided in a vehicle to be controlled and displaying information toward the outside of the vehicle to be controlled, the vehicle control device comprising a processor that includes:
   a peripheral object recognition unit configured to recognize an object that is present around the vehicle to be controlled;
   an object state recognition unit configured to recognize, in a situation where a first object and a second object are recognized by the peripheral object recognition unit, states of the first object and the second object including distance between the vehicle to be controlled and the first object, distance between the vehicle to be controlled and the second object, moving direction of the first object, and moving direction of the second object; and
   a display control unit configured to cause the display device to execute external notification processing for displaying a notification to the first object or the second object based on the states of the first object and the second object recognized by the object state recognition unit,
   wherein the display control unit executes the external notification processing when the first object being a pedestrian and the second object being another vehicle other than the vehicle to be controlled are recognized by the peripheral object recognition unit, and
   wherein the display control unit does not execute the external notification processing when the object state recognition unit recognizes that the pedestrian intends to cross in front of the vehicle to be controlled and recognizes that the other vehicle is approaching the vehicle to be controlled from the front of the vehicle to be controlled, and when the object state recognition unit recognizes that the pedestrian is stopped while facing the other vehicle.

2. The vehicle control device according to claim 1, wherein the display control unit executes the external notification processing for causing the display device to display a notification encouraging the pedestrian to wait, when the object state recognition unit recognizes that the pedestrian intends to cross in front of the vehicle to be controlled, and recognizes that the other vehicle is approaching the vehicle to be controlled from the front of the vehicle to be controlled, and when the object state recognition unit recognizes that the pedestrian is stopped without facing the other vehicle.

3. The vehicle control device according to claim 1, wherein the display control unit executes the external notification processing for causing the display device to display an alert notification to the pedestrian based on the distance between the vehicle to be controlled and the other vehicle recognized by the object state recognition unit, when the object state recognition unit recognizes that the pedestrian intends to cross in front of the vehicle to be controlled, and recognizes that the other vehicle is approaching the vehicle to be controlled from the front of the vehicle to be controlled.

4. The vehicle control device according to claim 3, wherein the display control unit changes the alert level to the pedestrian depending on the distance between the vehicle to be controlled and the other vehicle in the external notification processing.

5. The vehicle control device according to claim 3, wherein the display control unit executes the external notification processing for causing the display device to display a notification encouraging the pedestrian to cross, when the object state recognition unit recognizes that the other vehicle has stopped.

6. The vehicle control device according to claim 1, wherein the display control unit executes the external notification processing for causing the display device to display an alert notification to the other vehicle based on the distance between the vehicle to be controlled and the other vehicle recognized by the object state recognition unit and turns on a light of the vehicle to be controlled, when the object state recognition unit recognizes that the pedestrian intends to cross in front of the vehicle to be controlled, and recognizes that the other vehicle is approaching the vehicle to be controlled from the front of the vehicle to be controlled.

7. The vehicle control device according to claim 1, wherein the display control unit executes the external notification processing for causing the display device to display a notification encouraging the pedestrian to cross, when the object state recognition unit recognizes that the pedestrian intends to cross in front of the vehicle to be controlled, and recognizes that the other vehicle is approaching the vehicle to be controlled from the front of the vehicle to be controlled, and when the object state recognition unit recognizes that the other vehicle turns right or turns left before reaching the vehicle to be controlled.

8. The vehicle control device according to claim 1, wherein the display control unit executes the external notification processing for causing the display device to display a notification encouraging the pedestrian to wait, when the object state recognition unit recognizes that the pedestrian intends to cross behind the vehicle to be controlled, and recognizes that the other vehicle is approaching the vehicle to be controlled from the front of the vehicle to be controlled.

9. A vehicle control device that controls a display mode of a display device provided in a vehicle to be controlled and displaying information toward the outside of the vehicle to be controlled, the vehicle control device comprising a processor that includes:
a peripheral object recognition unit configured to recognize an object that is present around the vehicle to be controlled;
an object state recognition unit configured to recognize, in a situation where a first object and a second object are recognized by the peripheral object recognition unit, states of the first object and the second object including distance between the vehicle to be controlled and the first object, distance between the vehicle to be controlled and the second object, moving direction of the first object, and moving direction of the second object; and
a display control unit configured to cause the display device to execute external notification processing for displaying a notification to the first object or the second object based on the states of the first object and the second object recognized by the object state recognition unit, wherein
when the peripheral object recognition unit recognizes the first object being a first other vehicle other than the vehicle to be controlled and the second object being a second other vehicle other than the vehicle to be controlled and the first other vehicle, and when the object state recognition unit recognizes that the first other vehicle turns in front of the vehicle to be controlled in a direction approaching the vehicle to be controlled, and the second other vehicle passes from behind the vehicle to be controlled to the side of the vehicle to be controlled in a state where the second other vehicle faces the first other vehicle with the vehicle to be controlled intervening,
the display control unit executes the external notification processing for causing the display device to display a notification notifying the passage of the second other vehicle for the first other vehicle.

10. A vehicle control method for causing a computer to control a display mode of a display device provided in a vehicle to be controlled and displaying information toward the outside of the vehicle to be controlled, the vehicle control method comprising:
a peripheral object recognition step of recognizing an object that is present around the vehicle to be controlled;
an object state recognition step of recognizing, in a situation where a first object and a second object are recognized in the peripheral object recognition step, states of the first object and the second object including distance between the vehicle to be controlled and the first object, distance between the vehicle to be controlled and the second object, moving direction of the first object, and moving direction of the second object; and
a display control step of causing the display device to execute external notification processing for displaying a notification to the first object or the second object based on the states of the first object and the second object recognized in the object state recognition step,
wherein the external notification processing is executed when the first object being a pedestrian and the second object being another vehicle other than the vehicle to be controlled are recognized by the peripheral object recognition step, and
the external notification processing is not executed when the object state recognition step recognizes that the pedestrian intends to cross in front of the vehicle to be controlled and recognizes that the other vehicle is approaching the vehicle to be controlled from the front of the vehicle to be controlled, and when the object state recognition step recognizes that the pedestrian is stopped while facing the other vehicle.

* * * * *